US010666047B2

(12) United States Patent
Zubieta

(10) Patent No.: US 10,666,047 B2
(45) Date of Patent: May 26, 2020

(54) POWER MANAGEMENT CONCEPT IN DC DISTRIBUTED SYSTEMS

(71) Applicant: Arda Power Inc., Oakville (CA)

(72) Inventor: Luis Zubieta, Oakville (CA)

(73) Assignee: Arda Power Inc., Oakville, Ontario (CA)

( * ) Notice: Subject to any disclaimer, the term of this patent is extended or adjusted under 35 U.S.C. 154(b) by 0 days.

(21) Appl. No.: 15/856,775

(22) Filed: Dec. 28, 2017

(65) Prior Publication Data

US 2018/0198276 A1 Jul. 12, 2018

Related U.S. Application Data

(63) Continuation-in-part of application No. 14/858,856, filed on Sep. 18, 2015, now abandoned, which is a continuation-in-part of application No. 13/828,290, filed on Mar. 14, 2013, now Pat. No. 9,898,018.

(60) Provisional application No. 62/182,788, filed on Jun. 22, 2015.

(51) Int. Cl.
*H02J 1/12* (2006.01)
*H02J 3/38* (2006.01)
*H02J 7/00* (2006.01)
*H02J 1/10* (2006.01)
*H02J 1/14* (2006.01)
*G05F 1/12* (2006.01)

(52) U.S. Cl.
CPC ............. *H02J 1/12* (2013.01); *G05F 1/12* (2013.01); *H02J 1/102* (2013.01); *H02J 1/14* (2013.01); *H02J 3/381* (2013.01); *H02J 3/382* (2013.01); *H02J 7/0068* (2013.01); *H02J 3/383* (2013.01); *Y02E 10/563* (2013.01); *Y10T 307/352* (2015.04)

(58) Field of Classification Search
CPC ...... H02J 1/12; H02J 1/102; H02J 1/14; H02J 3/381; H02J 3/382; H02J 3/383; H02J 7/0068; G05F 1/12; Y10T 307/352; Y02E 10/563
USPC ........................................................ 307/24
See application file for complete search history.

(56) References Cited

U.S. PATENT DOCUMENTS

| 5,724,477 A | 3/1998 | Webster |
| 6,801,019 B2 | 10/2004 | Haydock et al. |
| 7,256,516 B2 | 8/2007 | Buchanan et al. |

(Continued)

OTHER PUBLICATIONS

Ampt, "Ampt Optimizers lower the cost of solar energy", http://www.ampt.com/products, May 12, 2015.

(Continued)

*Primary Examiner* — Hal Kaplan
(74) *Attorney, Agent, or Firm* — Head, Johnson, Kachigian & Wilkinson, PC

(57) ABSTRACT

A method includes the steps of providing a common DC bus to interconnect power elements to a DC distribution system using power converters. A first group of one or more of the elements (main element) is used to execute the primary function by automatically maintaining the DC bus voltage following a set point. The DC bus voltage set point is intentionally changed with slow dynamics according to a secondary function executed by the main element such that the average DC bus voltage regulated by the main element changes. A local logic is used on each of the power elements connected to the DC bus but different from the main element to modify their power generation or consumption as a result of changes in the measured average DC bus voltage such that they contribute to the fulfillment of the secondary level of control.

14 Claims, 7 Drawing Sheets

(56) References Cited

U.S. PATENT DOCUMENTS

| | | | |
|---|---|---|---|
| 7,692,321 | B2 | 4/2010 | Jones |
| 7,952,225 | B2 | 5/2011 | Reichard et al. |
| 8,378,641 | B2 | 2/2013 | Rozman et al. |
| 8,499,909 | B2 | 8/2013 | Mazumdar |
| 8,526,205 | B2 | 9/2013 | Garrity |
| 8,664,788 | B1 | 3/2014 | Wagoner |
| 2011/0205773 | A1 | 8/2011 | Wagoner |
| 2011/0273022 | A1 | 11/2011 | Dennis |
| 2012/0187766 | A1 | 7/2012 | Cleland |
| 2012/0228951 | A1 | 9/2012 | Lehmann |
| 2012/0267952 | A1 | 10/2012 | Ballatine |
| 2012/0280569 | A1 | 11/2012 | Alam |
| 2013/0076151 | A1 | 3/2013 | Bae et al. |
| 2013/0230121 | A1 | 9/2013 | Molko |
| 2013/0300380 | A1 | 11/2013 | Brunotte et al. |
| 2014/0050000 | A1 | 2/2014 | Teo |
| 2014/0183949 | A1 | 7/2014 | Murano |

OTHER PUBLICATIONS

Li Zhang, Tianjin Wu, Yan Xing, Kai Sun and Joseph M. Gurrero, "Power control of DC Microgrid Using DC Bus Signaling," IEEE, pp. 1926-1932, 2011.

Katie Malone, Electrical Load Management, Oct. 24, 2010, pp. 1-3.

Ampt Converters; http://www.ampt.com/products/solution/converters.

Tigo Energy; http://www.tigoenergy.com/products.

POWER MANAGEMENT CONCEPT IN DC DISTRIBUTED SYSTEMS

CROSS-REFERENCE TO CO-PENDING APPLICATIONS

This application is a continuation-in-part of U.S. patent application Ser. No. 14/858,856, filed Sep. 18, 2015, which application was a continuation-in-part of U.S. patent application Ser. No. 13/828,290 filed Mar. 14, 2013 and claims priority on U.S. Provisional Patent Application Ser. No. 62/182,788, filed Jun. 22, 2015.

BACKGROUND OF THE INVENTION

1. Field of the Invention

The present invention is a method and system to interconnect and operate several conventional or alternative power generators, loads, and/or energy storage elements physically separated from each other in a DC distribution system.

2. Prior Art

DC power distribution systems are used to exchange power among multiple sources (mainly renewable energy resources), loads, and energy storage elements by connecting those elements to a common DC bus using power converters or direct connection in a concept generally called DC microgrid. A DC microgrid could be as simple as solar+storage installation or as complex as multi MW systems with many types of different generators, multiple ratings and varieties of loads, several different types of energy storage elements and multiple inverters connected or separated from the grid.

The reliability of a DC microgrid depends on the control of the DC bus voltage within specified limits, which depends on balancing the power production with the power consumption. Because renewable energy sources are intermittent in nature and loads can suddenly change, fast response from power converters and capacitive energy storage in the DC bus provide the means to instantaneously maintain the DC bus. Methods to control the DC bus voltage are well known and developed where one or multiple elements connected to the DC bus change their power quickly as the DC bus voltage drifts from the set point to balance the total power in the bus and maintain the DC bus voltage within acceptable limits.

In power distributed systems where the different elements are distant from each other, the regulation of the DC voltage is challenging. Some implementations use a single element to regulate the DC bus voltage but the regulating element has to change depending on the operation conditions. In other implementations, the responsibility to regulate the DC bus is shared amongst multiple elements that have to operate in coordination. The droop method where a virtual resistance is introduced at the output of the power converters that participate of the DC bus voltage regulation has been successfully used in practical applications. However, physical distances between elements used in the DC bus voltage regulation compromise the stability and reliability of the system. In addition to maintaining the DC bus voltage, in most cases it is necessary to execute additional functions in the DC distributed system such as an energy management strategy to maintain the energy storage elements within their charge limits or grid ancillary functions (load shifting, grid support, etc). Frequently, these additional functions are coordinated by the inverters connected to the AC utility grid but they are still needed when operated independent from the AC utility or in systems with low power interconnection to the AC utility. Traditionally, these additional functions (secondary functions) demand additional coordination and communication amongst the different components connected to the DC bus.

Wired and wireless communication means are commonly used to achieve power and energy balance between the different elements at the expense of extra cost and low flexibility. Intentionally changing the value of the DC bus voltage called voltage signaling has been used as a means of communication amongst elements in the power management of a DC distribution system. The present implementations and their limitations can be divided in two groups:

- Some implementations use a single element or small group of elements to maintain the bus and intentionally change the voltage so that discreet voltage levels in the DC bus indicate changes in operating mode to the other elements connected to the bus. The new operating mode shifts the responsibility to maintain the DC bus voltage to a different element and forces a quick reaction of all the elements in order to maintain operation. Precise voltage measurements for all the components connected to the bus are fundamental to the successful operation of the system. Also, aging and tolerances in sensors degrade highly the performance of the DC distributed system.
- In other cases, DC bus voltage changes, resulting from changes in the power balance, trigger reactions in multiple or all of the elements to balance the power and maintain the DC bus within a specified range of voltages. In this case, the system stability is difficult to achieve and oscillations are common. Furthermore, for these concepts it is not possible to incorporate a secondary function, such as energy management, on top of the power balancing.

In general, all of these proposals require major re-engineering when additional resources or loads are added to the DC microgrid or when a new installation with different ratings is implemented.

SUMMARY OF THE INVENTION

The invention describes a method for the operation and control of a DC microgrid system to achieve, in addition to DC bus voltage regulation, a secondary performance function such as energy management using only the DC bus voltage as means of communication. The proposed method uses one element on the microgrid as the brain of the microgrid operation (main element).

Because all the power elements connected to the DC distribution system are connected to the DC bus, all of them will have access to a DC bus link voltage measurement (normally this voltage measurement is part of the power converters as it is needed for control and protection). The DC-link voltage is maintained in a classical way by the main element executing a control algorithm like the one represented in FIG. 3. In addition, the main element has internal operating restrictions, such as its state of charge, and executes a local algorithm representing a secondary function to ensure its operation within those operating restrictions. The output of this algorithm is a change in DC voltage set point such that the average DC voltage is slightly drifted from the nominal value. Because the main element has the capability to maintain the DC bus voltage, only a modification in its software is needed to intentionally vary the average DC-link voltage depending on the secondary function.

All the elements connected to the DC bus except the main element are measuring the average DC link voltage and reacting to it by changing their output in a manner such that the full effect is the fulfillment of the secondary function. All these elements are not aware of the requirements, limitations, or constraints of the secondary function but simply follow the direction from the main element that has been communicated using the average DC link voltage. Note that only the main element is responsible for the fast regulation of the DC bus voltage while all the other elements respond to the much slower average voltage. This increases the stability of the system and enables self-calibration. The changes in the power generated or consumed by each element except the main element with respect to the DC bus voltage has slow transients resulting in smooth gradual transitions instead of discreet sudden changes. As a result, the system stability is enhanced and the successful operation is not affected by normal tolerances in the voltage sensors embedded in the different components.

According to one embodiment of the invention, a battery storage element coupled with a power converter represents the main element of the system. The main element or energy storage unit is commonly provided with sensors to generate an estimation of the state of charge for the unit. The state of charge has to be maintained within limits to enhance the performance, life expectancy or safety for the energy storage unit. Maintaining the state of charge within those limits represents the secondary function. The intelligence embedded in the energy storage unit uses the estimated state of charge to change the set point for the DC bus voltage. Since the energy storage unit is capable of regulating the DC bus voltage, the average voltage of the DC bus follows this set point.

According to another embodiment of the invention, an AC/DC converter exchanging power between the AC grid and the DC bus is the main element of the installation. The main element is programmed or periodically receives a loading pattern that depends on the cost of the electricity and time of the day and that represents the secondary function. The AC/DC converter is then regulating the DC bus voltage while changing its set point to produce a response that follows the loading pattern.

In another aspect of the invention, the multiple elements different from the main element are connected to the DC bus either directly or through a power converter. These elements may include solar PV generation, conventional generators, controllable loads, etc. Some or all of these elements have the capability to measure the DC bus voltage and to limit the power consumed or generated by them as a function of the measured DC bus voltage. These elements are then programmed with local functions to modify their power and support the main element in maintaining the state of charge within the desired limits.

Another aspect of the invention is that the local functions of the elements different from the main element are different from each other and selected based on each element's preferred operating conditions and operational cost.

Yet another aspect of the invention is that the different elements can be physically distant from each other and operate without any information about the other elements while still cooperation to the fulfillment of the secondary function. In addition, the centralized control of the average DC bus voltage and the smooth response of the power elements responding to the average DC bus voltage provide a true plug-and-play functionality where power elements can be added or removed from the DC bus without the need for re-engineering or re-tuning of the system.

DETAILED DESCRIPTION OF THE PREFERRED EMBODIMENTS

The invention presents a method to interconnect and control a DC power distribution system composed by multiple independent power elements including power generators and power consumers. The method enables achieving multiple levels of control using the DC bus voltage as the only mean of communication amongst the power elements. The primary level of control is the DC bus voltage regulation while the second level of control involves an independent variable that has slower dynamic response than the DC bus voltage. In other words, the changes in the independent variable controlled by the second level of control are considerably slower than the changes in DC bus voltage.

Figure 1:
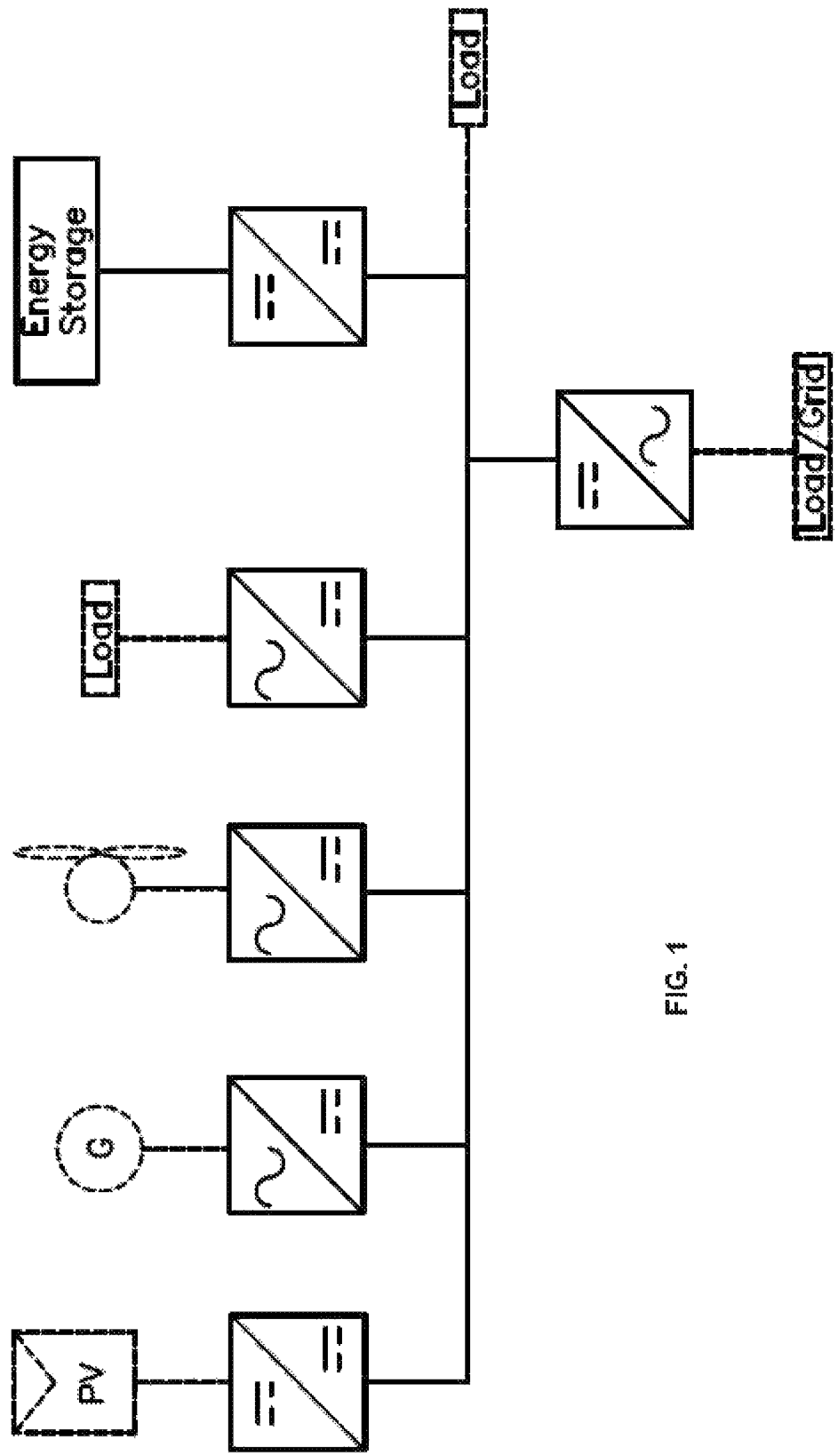
FIG. 1 is a schematic representation of a microgrid based on a DC distribution system where multiple elements are joined and interconnected in a common DC bus.

FIG. 1 illustrates a microgrid based on a DC distribution system. The DC distribution system uses a common DC bus to join multiple power elements and the continuous operation of the system depends on maintaining the DC bus voltage regulated within the normal operating range. Nevertheless, the different power elements connected to the DC distribution system have individual requirements to operate in their most efficient, stable and durable manner that are completely independent of the DC bus voltage regulation. Some DC distribution systems use one element to execute the DC bus voltage regulation. However, for complex DC distribution systems including different types of power elements and operating modes the DC bus voltage regulation may need to be shared between different power elements.

Figure 2:
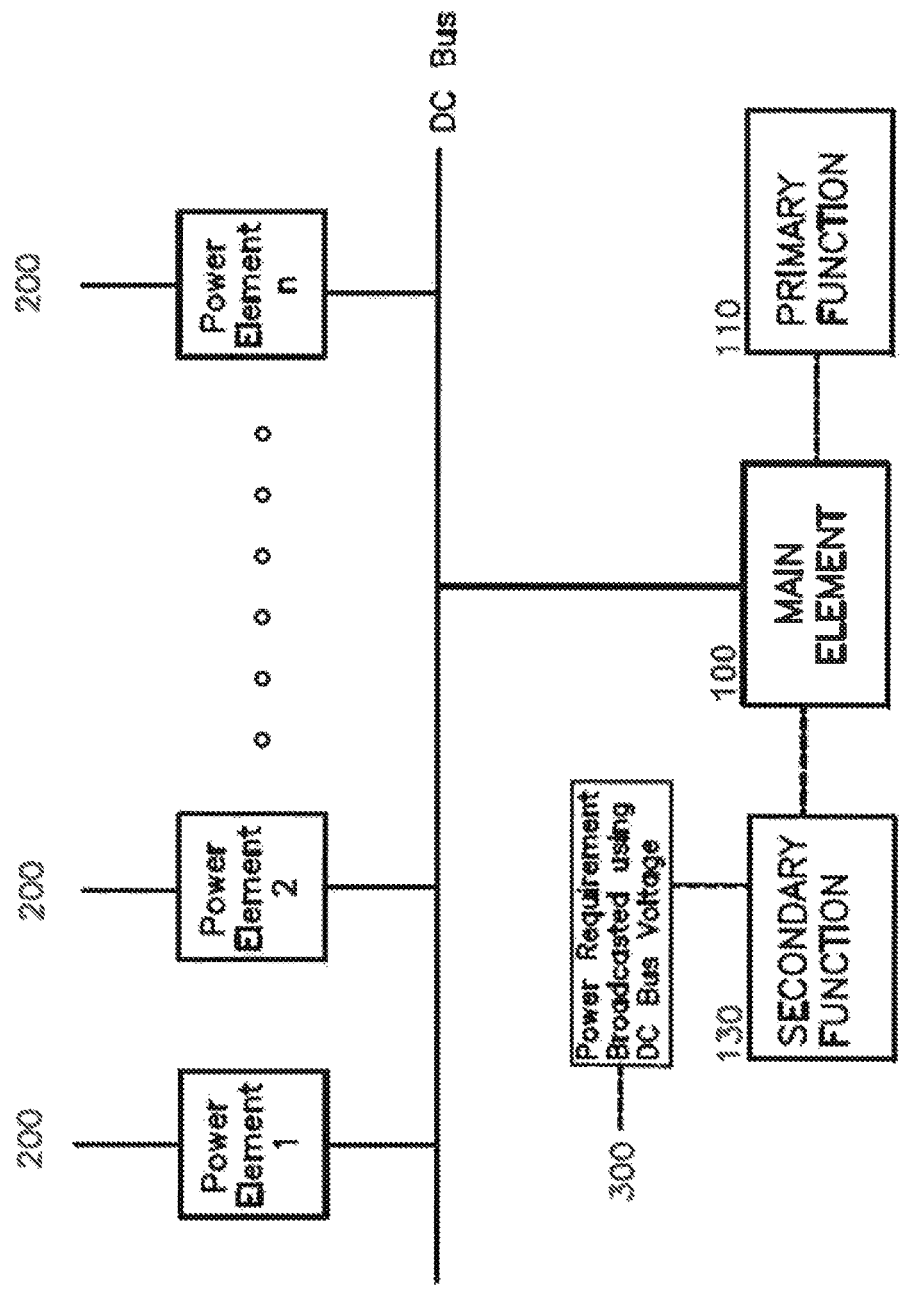
FIG. 2 is a schematic representation of the present invention in general terms where one element is shown as the main element executing the primary function to regulate the voltage as well as the second function that is broadcasted using the DC bus voltage. The other power elements receive the broadcasted message by measuring the DC bus voltage and act accordingly modifying their power

The proposed method represented in FIG. 2 uses one of the power elements in the DC distribution system defined as the main element 100 to execute the primary level of control or DC bus voltage regulation 110 under all the operating modes of the DC distribution system. The main element ensures that the average value of the DC bus voltage is approximately equal to a set point or reference value. Therefore, it has to respond quickly by changing its power when the measured voltage deviates from the set point.

Figure 3:
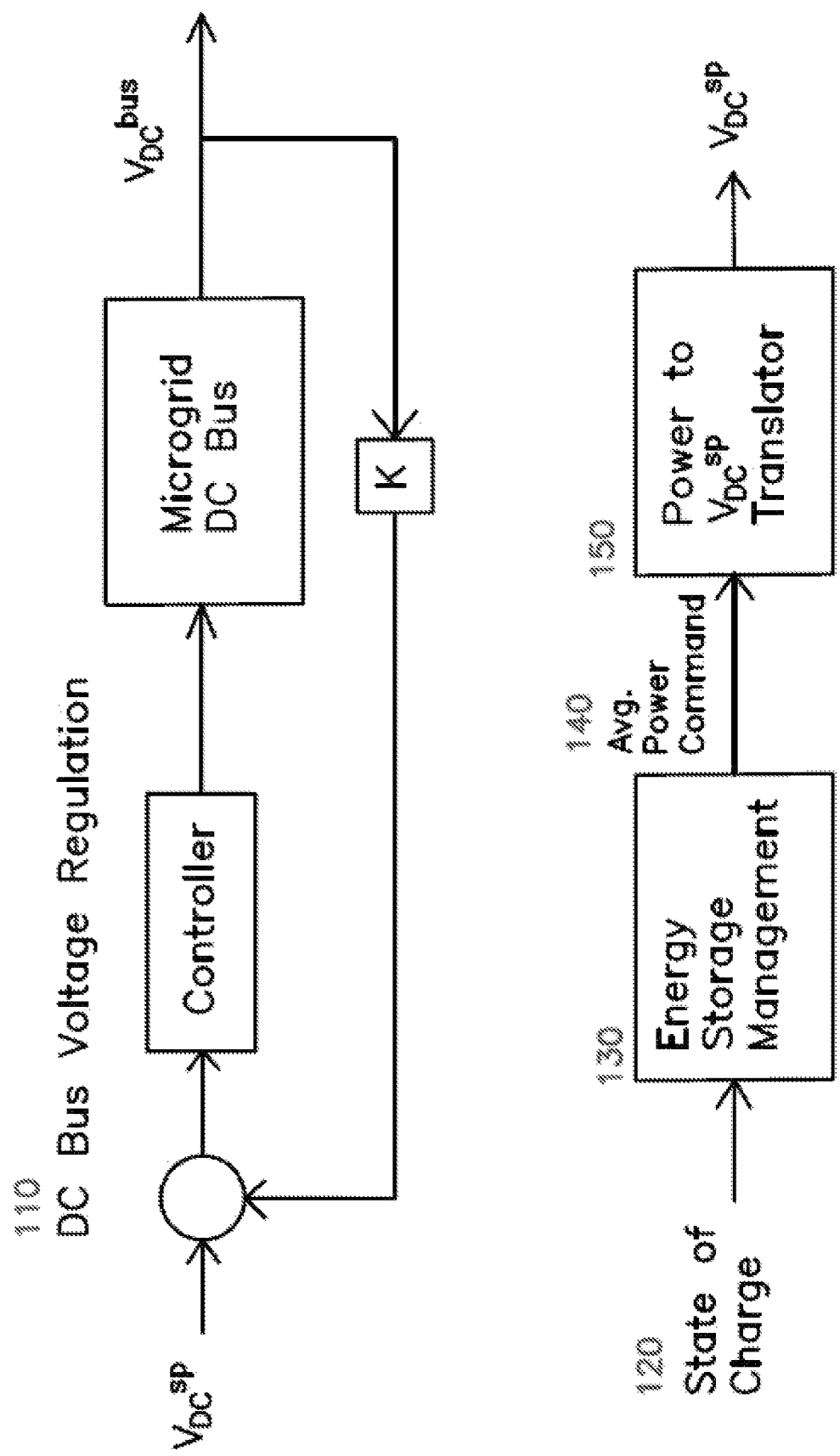
FIG. 3 is a block diagram for the regulator executing the DC bus voltage control and of the algorithm producing a deviation of the DC bus voltage set point to fulfill a secondary function. Both of these functions are located in the main element.
Figure 5:
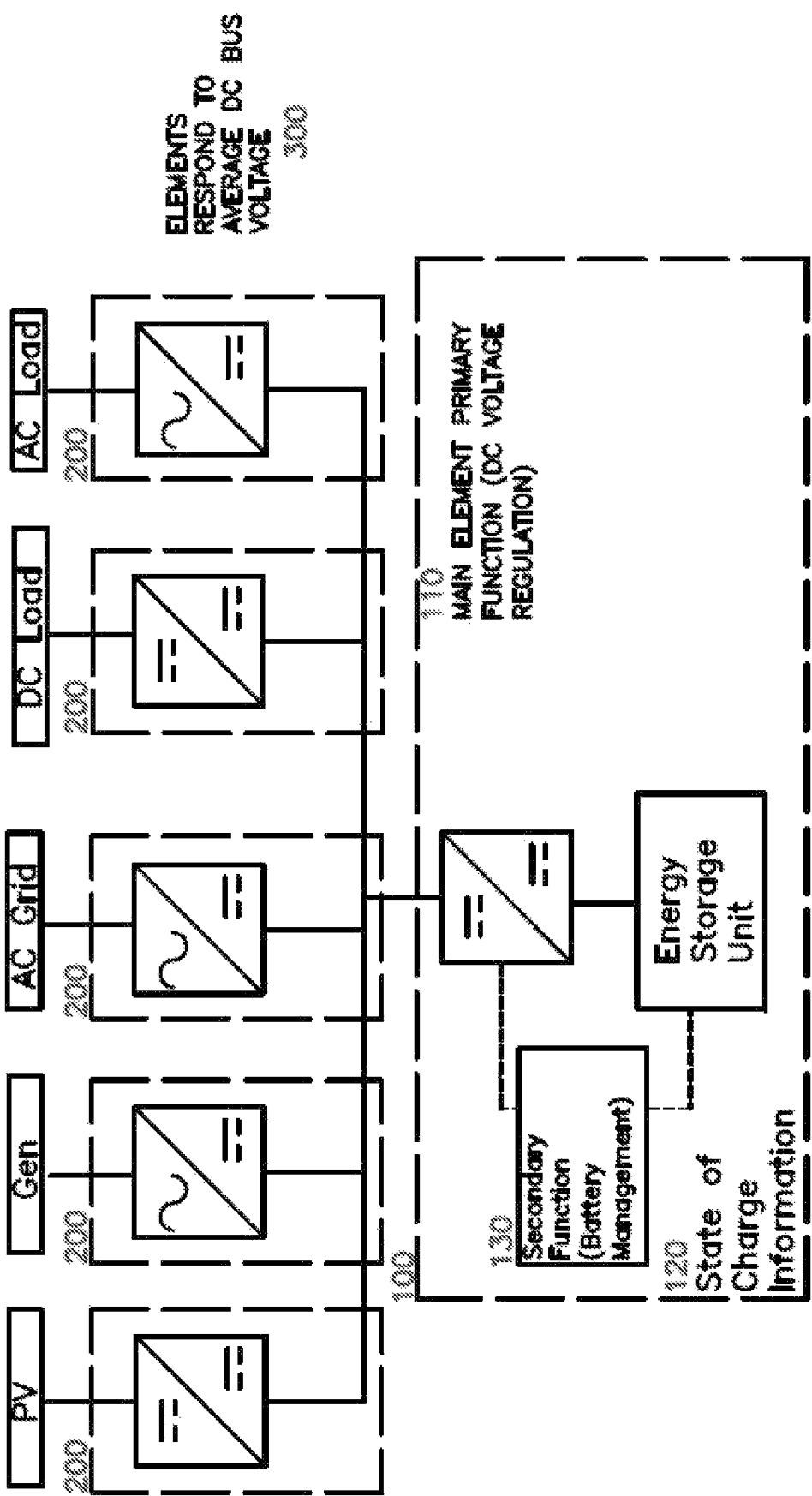
FIG. 5 is a schematic representation of one embodiment of the invention where the main element is associated with a battery storage unit.
Figure 6:
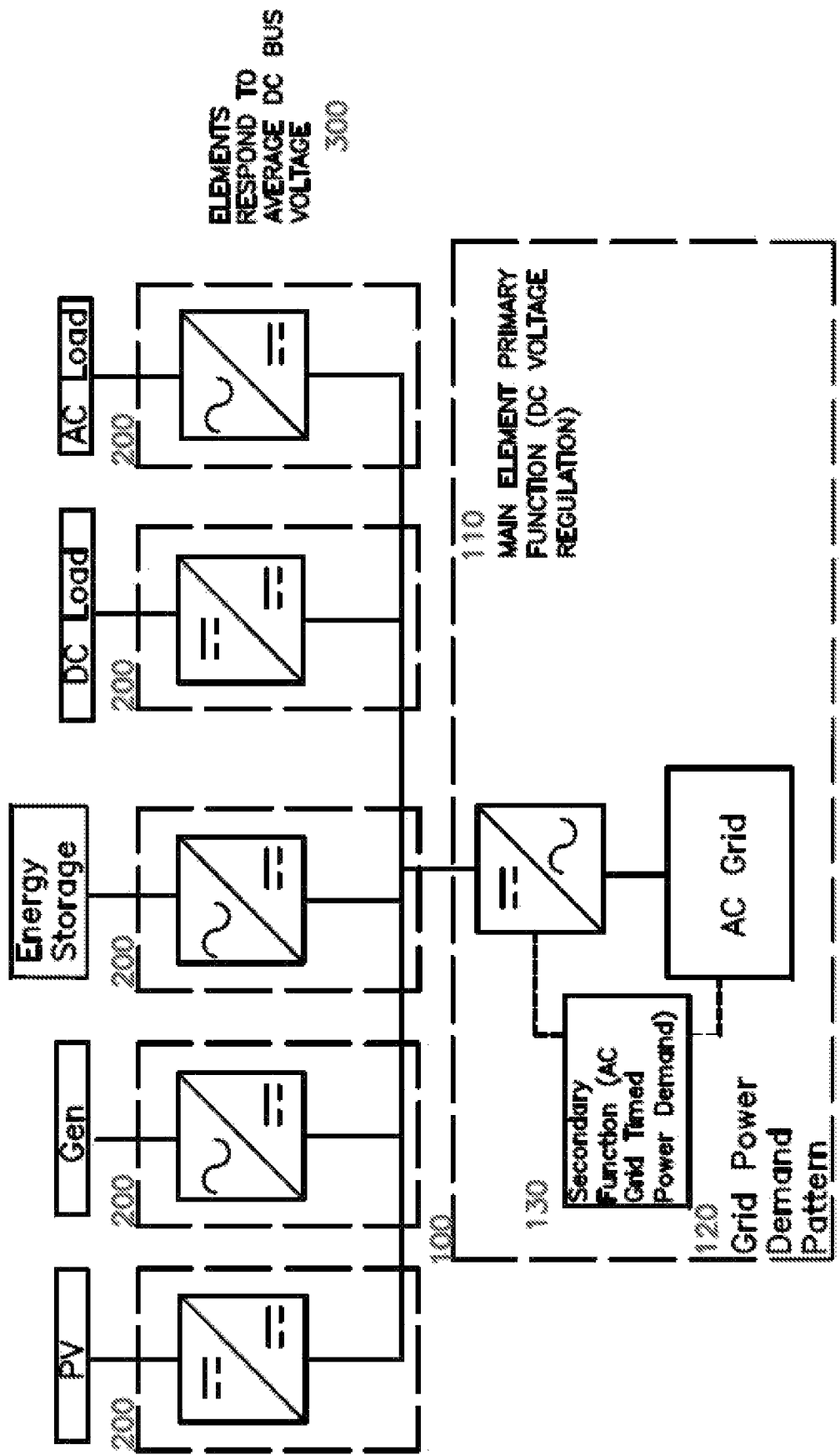
FIG. 6 is a schematic representation of another embodiment of the invention where the main element is associated with a bidirectional DC/AC converter.

In most practical distribution systems, the main element has a limitation of for how long it can continue regulating the DC bus voltage before degradation or unsafe conditions occur. For the embodiment shown in FIG. 5, an energy storage system is used as the main element. In this case, the state of charge 120 provides an indication of the capability for the energy storage unit to continue regulating the DC bus voltage. To ensure the continuous operation of the DC distribution system over long time, the state of charge should be maintained within a specific range. The state of charge represents a secondary variable that is independent of the power required to regulate the DC bus voltage but that has to be controlled. In another embodiment illustrated in FIG. 6, the main element is associated with a bi-directional DC/AC converter. An AC grid may be used as the main element. In this case, the secondary function is related to AC grid-timed power demand. In the proposed method, the main element also incorporates a secondary function 130, represented in FIG. 3, and dependent on the secondary variable 120 that results in a preferred main element power command 140 so that the main element maintains the secondary variable within its design limits.

Previous art uses complex algorithms to divide the power command amongst all the elements connected to the DC distribution system and then communicates the result to each element. According to this invention, the main element converts the power command 140 to a DC bus voltage set-point deviation using a function 150 embedded in the main element and the modified set-point is followed by the main element DC bus voltage regulation 110. Since the voltage set-point changes at a rate much slower than the dynamics of the DC bus voltage, the system will maintain a regulated but slowly changing DC bus voltage. The power command is consequently broadcasted using the DC bus voltage 300 to all the elements connected to the DC distribution system. The range of variation for the DC bus voltage set point should be limited within a range that do not result in any degradation in performance or incorrect operation of any of the power elements.

Figure 4:
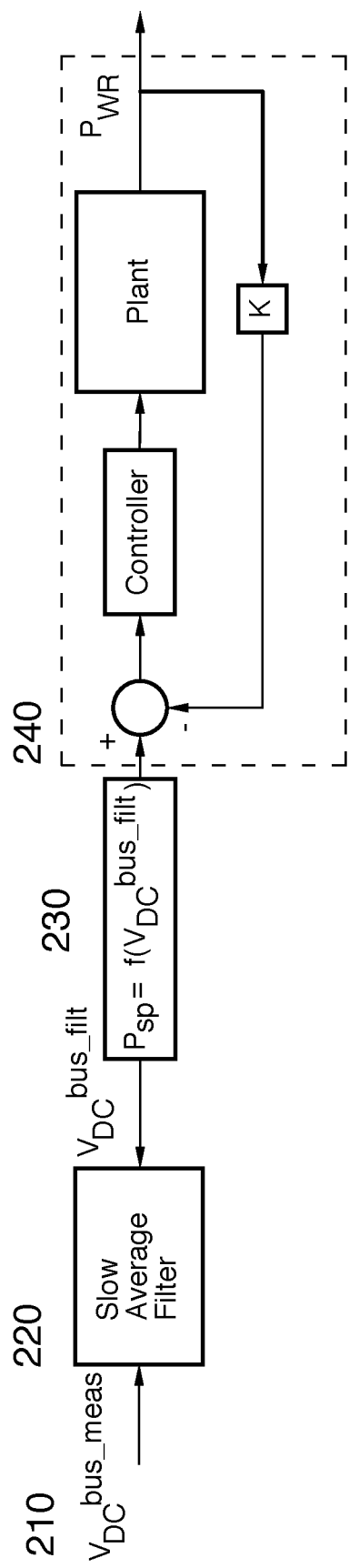
FIG. 4 is a block diagram of the response of the elements connected to the DC bus different from the main element to modify their power as function of the DC bus voltage.

FIG. 4 illustrates responses of the elements connected to the DC bus different from the main element to modify their power as a function of the DC bus voltage. In FIG. 4, all the power elements connected to the DC bus that are not the main element 200 and that will participate in the control method incorporate the capability to measure the $V_{DC}^{bus-meas}$ DC bus voltage 210. The measured DC bus voltage $V_{DC}^{bus-meas}$ 210 is then filtered 220 to ensure that these elements will only respond to the slowly changing average DC voltage and not to transients resulting from typical elements connected to the DC distribution system. The filtered DC bus voltage $V_{DC}^{bus-fil}$ is used internally by each element to calculate the power reference 230 for that element generation or consumption. The power is regulated internally by the element using well known controllers 240. Because of the heavy filtered voltage used in the power reference calculation and the slow changes of the average DC bus voltage regulated by the main element, the transients in power are slow and smooth providing a more stable system.

The algorithm to set the average DC-bus voltage as function of the secondary variable may include linear, quadratic, integral, or derivate terms amongst others. It would be recognized for those skilled in the art that the secondary variable in addition to the state of charge or average power could be associated with energy, power, current, temperature or any other variable that can be regulated based on accumulated energy or average power. The variable to be used depends on the specific constraints for each application. According to this invention, the average DC bus voltage is continuously changed by the main element within a small range. Since the changes are smooth and progressive, the system is robust against tolerances in the DC bus voltage measurement of the different components. In other words, if a small change in the average DC bus voltage does not produce the expected response, the average DC bus voltage is changed even more until the desired response is achieved.

It should be understood that that the function on each of the power elements different from the main element changing the generated or consumed power as a function of the average DC bus voltage can use other variables such as current, fuel injection, etc. that result in a net change of average power. Furthermore, this function does not necessarily have to follow a linear relationship with the average DC bus voltage. Instead it may include other linear or non-linear terms depending on the specific properties of each distributed resource. For example, in a system combining solar with wind and/or Fuel Cells in a DC distribution system, it may be preferable that the operation of the fuel cell is maintained close to maximum power in order to maximize the efficiency and lifetime of the generator while the solar and wind can be ramped without performance penalty. In this embodiment, the fuel cell power can be stepped down when the average DC-bus voltage reaches a higher value while than the one used to ramp the solar and wind. In general, the average DC-bus voltage is variable according to a function preprogrammed in the main element as in (1), and the power, current, energy, or other adjusted variable from each power element in the DC distribution system is decided based on the average DC-bus voltage using a pre-established equation as in (2)

$$Vdc_{Link}=f(P,E,I) \quad (1)$$

$$P,E,I=f(Vdc_{Link}) \quad (2)$$

The limiting functions for the different generators and loads may be determined by cost, performance, or durability decisions and may differ from one generator to another in the same DC distribution system.

Figure 7:
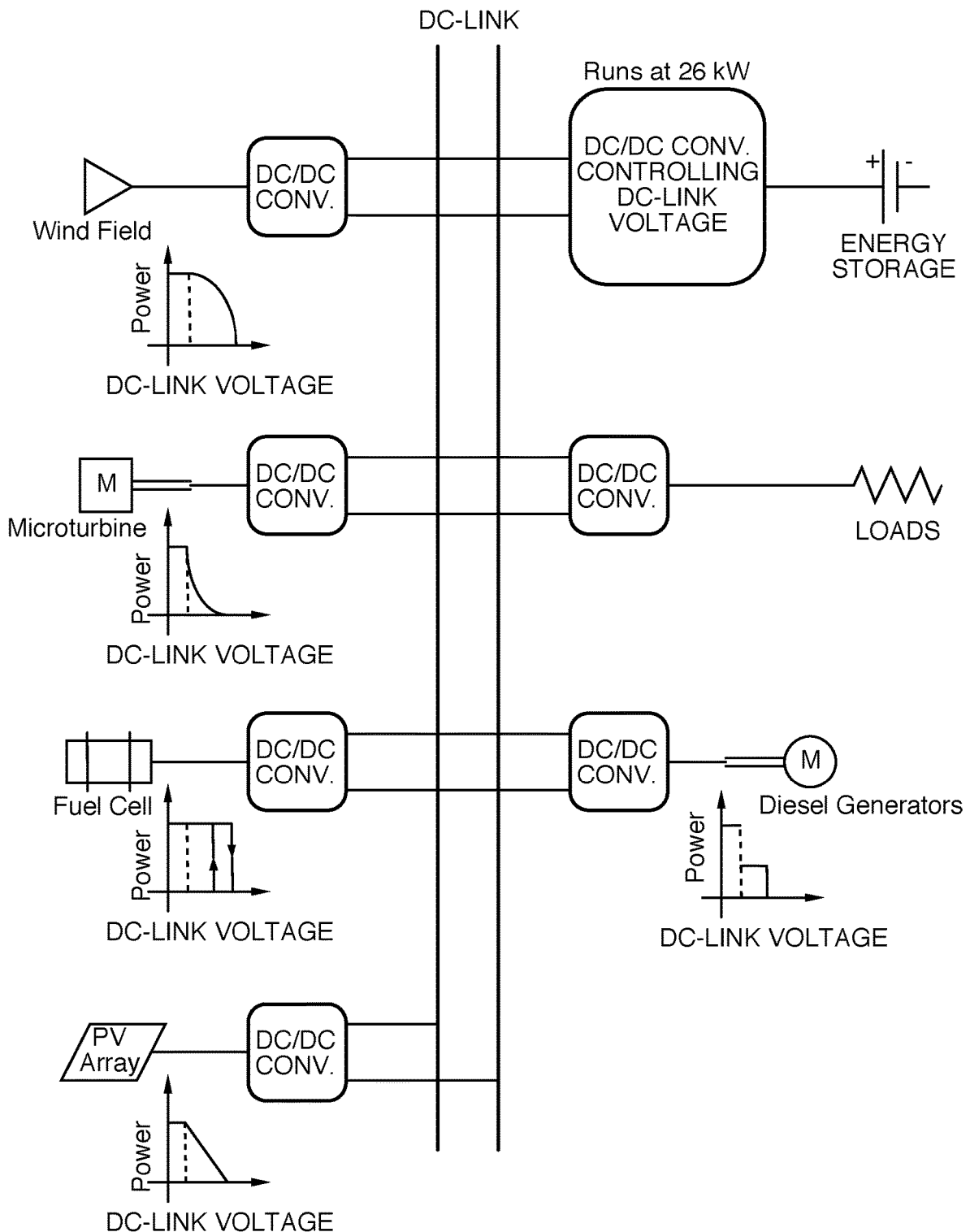
FIG. 7 is a full representation of a DC microgrid with the different functions embedded in the different elements.

FIG. 7 shows the generalization of the proposed method for a microgrid based on a DC bus. Alternative and conventional power generators and loads in a common DC-bus, operate in unison forming a microgrid executing energy management in addition to power managements without classical communication amongst the power elements. An energy storage resource is used to instantaneously balance the generation with the load and maintaining the DC-bus voltage at the desired level. A controller that may or may not be part of the energy storage unit is responsible for keeping the state of charge for the energy storage within limits. The energy storage controller adjusts the average DC-bus voltage to get more or less energy from the distributed resources and the distributed resources could have different power vs average DC-bus voltage (PvsV) functions depending on their particular operating cost and preferred operating mode. The PvsV equations can automatically change during the day or during different seasons during the year to optimize the operating cost of the micro-grid.

Although the example in FIG. 7 shows the loads as uncontrolled, some loads with lower criticality could also be programmed with PvsV equations or "shaved" based on the average DC-bus voltage so that they shut down partially or totally if there is low generation in the micro-grid and the energy storage is reaching low levels of charge. This will give full flexibility to controller to adjust the energy production and energy consumption within the microgrid without the need for communication to ensure the stability and continuous operation of the system. As in the case of the generators, the loads equation as function of the voltage could change depending on the time, season or other external characteristics.

It should be understood that the invention is not limited in its application to the examples and preferred embodiments presented herein. Variations in the main element, use of multiple main elements in coordination, diversity of power elements, can be foreseen as using the same control concept presented in this invention. Furthermore, DC distribution systems packaged as a single unit, where the physical distance amongst elements is small, or using multiple DC busses at different voltages can also employ the concepts proposed in this discussion and constitute alternative aspects of the present invention.

What is claimed is:

1. A method to interconnect and control several power elements including conventional or alternative power generators, loads, and/or energy storage units in a DC distribution system, wherein the method comprises:
   providing a common DC bus to interconnect the power elements to the DC distribution system using power converters;
   implementing multiple levels of control for operation of the DC distribution system, the multiple levels of control including:
   a primary level of control, executed by a primary function, for regulating the DC bus voltage; and
   at least one secondary level of control with a slower dynamic response than the primary level of control, executed by a secondary function, for maintaining a variable independent of the DC bus voltage regulation within specified limits;
   using a first group of one or more of the elements as a main element to execute the primary function and automatically maintain the DC bus voltage at a set point;
   intentionally changing the DC bus voltage set point according to the secondary function such that an average DC bus voltage regulated by the main element changes;
   providing all the power elements connected to the DC bus other than the main element with voltage sensors so that they can measure the changes in average DC bus voltage; and
   using a local algorithm on each of the power elements except the main element connected to the common DC bus to modify their power generation or consumption as a result of changes in the measured average DC bus voltage such that they contribute to the fulfillment of the secondary level of control.

2. The method according to claim 1, wherein the main element modifies the DC bus voltage set point as a continuous function of the variable to provide for transitions in the system.

3. The method according to claim 2, wherein the continuous function used to obtain the DC bus voltage set point can be changed hourly, daily or seasonally depending on climatic or economic indicators.

4. The method according to claim 1 wherein the power elements other than the main element change their power generation or consumption as a continuous function of the average measured DC bus voltage to provide for transitions in the system.

5. The method according to claim 4, wherein the continuous function for each element other than the main element used to modify the power generation or consumption depends on such element's preferred operating conditions and is independent of any other element connected to the DC bus.

6. The method according to claim 5, wherein the continuous function used to modify the power generation or consumption can be changed hourly, daily or seasonally depending on climatic or economic indicators.

7. The method according to claim 1, wherein the main element is one or more energy storage devices connected to the DC bus through power converters and the at least one secondary level of control is given by a set of requirements for energy or battery management.

8. The method according to claim 1, wherein the main element is one or more grid connected DC/AC converters and the at least one secondary level of control is given by a set of AC grid average power generation or consumption constraints.

9. The method according to claim 1, wherein the distribution system may run connected to the AC utility grid or independent of it.

10. The method according to claim 1, wherein the local algorithm executing the primary and secondary functions is embedded in main element hardware components.

11. The method according to claim 1, wherein the local algorithm executing the primary and secondary functions is located in a controller external to the main element.

12. The method according to claim 1, wherein the local algorithm executing a change in power generated or consumed by the power elements other than the main element is embedded in respective power element hardware components.

13. The method according to claim 1, wherein the local algorithm executing a change in power generated or consumed by the power elements other than the main element is located in a controller external to the main element.

14. The method according to claim 1, wherein the distribution system controlled by the method represents a DC microgrid.

* * * * *